US012449298B2

(12) United States Patent
Karlsen et al.

(10) Patent No.: US 12,449,298 B2
(45) Date of Patent: Oct. 21, 2025

(54) POWER MONITORING IN FIBER-COUPLED LASER SYSTEMS

(71) Applicant: NLIGHT, INC., Camas, WA (US)

(72) Inventors: Scott R. Karlsen, Battleground, WA (US); David R Balsley, Portland, OR (US); Nicolas Trent Meacham, Vancouver, WA (US); Austin Hagarty, Camas, WA (US); Dahv A. V. Kliner, Portland, OR (US)

(73) Assignee: nLIGHT, Inc., Camas, WA (US)

( * ) Notice: Subject to any disclaimer, the term of this patent is extended or adjusted under 35 U.S.C. 154(b) by 241 days.

(21) Appl. No.: 18/138,485

(22) Filed: Apr. 24, 2023

(65) Prior Publication Data

US 2023/0349754 A1 Nov. 2, 2023

Related U.S. Application Data

(60) Provisional application No. 63/336,950, filed on Apr. 29, 2022.

(51) Int. Cl.
*G01J 1/42* (2006.01)
*G01J 1/04* (2006.01)

(52) U.S. Cl.
CPC .......... *G01J 1/4257* (2013.01); *G01J 1/0414* (2013.01); *G01J 1/0437* (2013.01)

(58) Field of Classification Search
CPC ...... G01J 1/4257; G01J 1/0414; G01J 1/0437; H01S 3/0014; G02B 6/001; G02B 6/4286
See application file for complete search history.

(56) References Cited

U.S. PATENT DOCUMENTS

| | | | | |
|---|---|---|---|---|
| 4,335,933 A | * | 6/1982 | Palmer | G02B 6/4259 385/36 |
| 4,343,532 A | * | 8/1982 | Palmer | G02B 6/29331 385/36 |
| 4,398,794 A | * | 8/1983 | Palmer | G02B 6/4286 385/32 |
| 4,618,211 A | | 10/1986 | Fleury | |
| 4,654,520 A | | 3/1987 | Griffiths | |
| 4,714,829 A | | 12/1987 | Hartog et al. | |
| 4,852,117 A | | 7/1989 | Po | |

(Continued)

OTHER PUBLICATIONS

Reupert Aaron et al: "Radiation from Side-Emitting Optical Fibers and Fiber Fabrics: Radiometric Model and Experimental Validation", Advanced Photonics Research, [Online] vol. 3, No. 4, Apr. 17, 2022 (Apr. 17, 2022), p. 2100104, XP093066041, ISSN: 2699-9293, DOI: 10.1002/adpr.202100104; Retrieved from the Internet: URL:https://onlinelibrary.wiley.com/doi/fu ll-xml/10.1002/adpr.202100104> [retrieved on Jul. 21, 2023] the whole document.

(Continued)

*Primary Examiner* — Jonathan M Hansen
(74) *Attorney, Agent, or Firm* — Wiley Rein LLP

(57) ABSTRACT

Some embodiments may include a power monitor to measure power of laser light propagating in a core of an optical fiber; the power monitor to generate a sensor signal using an optical sensor having a light sensitive section with no line of sight to part of the optical fiber; wherein the sensor signal is derived from light emerging laterally from the part of the optical fiber. Other embodiments may be disclosed and/or claimed.

19 Claims, 8 Drawing Sheets

(56) References Cited

U.S. PATENT DOCUMENTS

| | | |
|---|---|---|
| 5,015,067 A | 5/1991 | Levatter |
| 5,319,195 A | 6/1994 | Jones et al. |
| 6,002,822 A | 12/1999 | Strasser et al. |
| 6,265,710 B1 | 7/2001 | Walter |
| 7,146,073 B2 | 12/2006 | Wan |
| 7,957,438 B2 | 6/2011 | Simons et al. |
| 8,988,669 B2 | 3/2015 | Liao |
| 8,988,699 B2 | 3/2015 | Liao |
| 10,310,201 B2 | 6/2019 | Kliner |

OTHER PUBLICATIONS

USPTO; International Search Report and Written Opinion for PCT/US2023/019632; Aug. 29, 2023; 14 pages.

\* cited by examiner

POWER MONITORING IN FIBER-COUPLED LASER SYSTEMS

TECHNICAL FIELD

This application is a non-provisional of and claims priority benefit to U.S. provisional application Ser. No. 63/336,950 filed on Apr. 29, 2022, which is incorporated by reference herein in its entirety.

TECHNICAL FIELD

The present disclosure relates to fiber-coupled laser systems, and some embodiments relate to power monitoring in laser systems.

BACKGROUND

Laser systems are widely used in industrial processes (e.g., cutting, welding, cladding, heat treatment, etc.) In some laser systems (e.g., in fiber lasers), the optical gain medium includes one or more active optical fibers with cores doped with rare-earth element(s). The rare-earth element(s) may be optically excited ("pumped") with light from one or more semiconductor laser sources.

Various applications may benefit from monitoring one or more characteristics of laser light, such as using a photodector to generate an electrical signal representative of the power of the laser light. U.S. Pat. No. 6,265,710 describes power monitoring based on capturing light emerging laterally from a glass fiber using a photodetector located next to a side of the glass fiber. This is done by configuring the photodetector with its light-sensitive surface located in a plane that is next to the glass fiber and that runs parallel to the longitudinal direction of the glass fiber. In other words, the photodetector is facing the fiber to provide it with a line of sight (LOS) to the fiber (e.g., to the first side of the fiber).

The photodetector arranged with the LOS to the fiber may directly capture light emerging laterally from the glass fiber, i.e. "laterally emerging direct light," which travels unobstructed along light path extending directly from a first side of the fiber to the fiber-facing photodetector. If the quantity of the laterally emerging direct light is not sufficient, the '710 patent provides that light emerging laterally from the second opposite side of the glass fiber may also be captured using the fiber facing photodetector, by placing a reflector such as a polished metal plate or a mirror-coated glass plate on the opposite side of the fiber.

U.S. Pat. No. 8,988,669 teaches a photodetector located "in close proximity" to the fiber to capture laterally emerging light. Like the '710 patent, the '669 patent teaches arranging the photodetector with a LOS to the fiber. This is illustrated in FIG. 4 of the '669 patent.

BRIEF DRAWINGS DESCRIPTION

The accompanying drawings, wherein like reference numerals represent like elements, are incorporated in and constitute a part of this specification and, together with the description, explain the advantages and principles of the presently disclosed technology.

DETAILED DESCRIPTION

Figure 1:
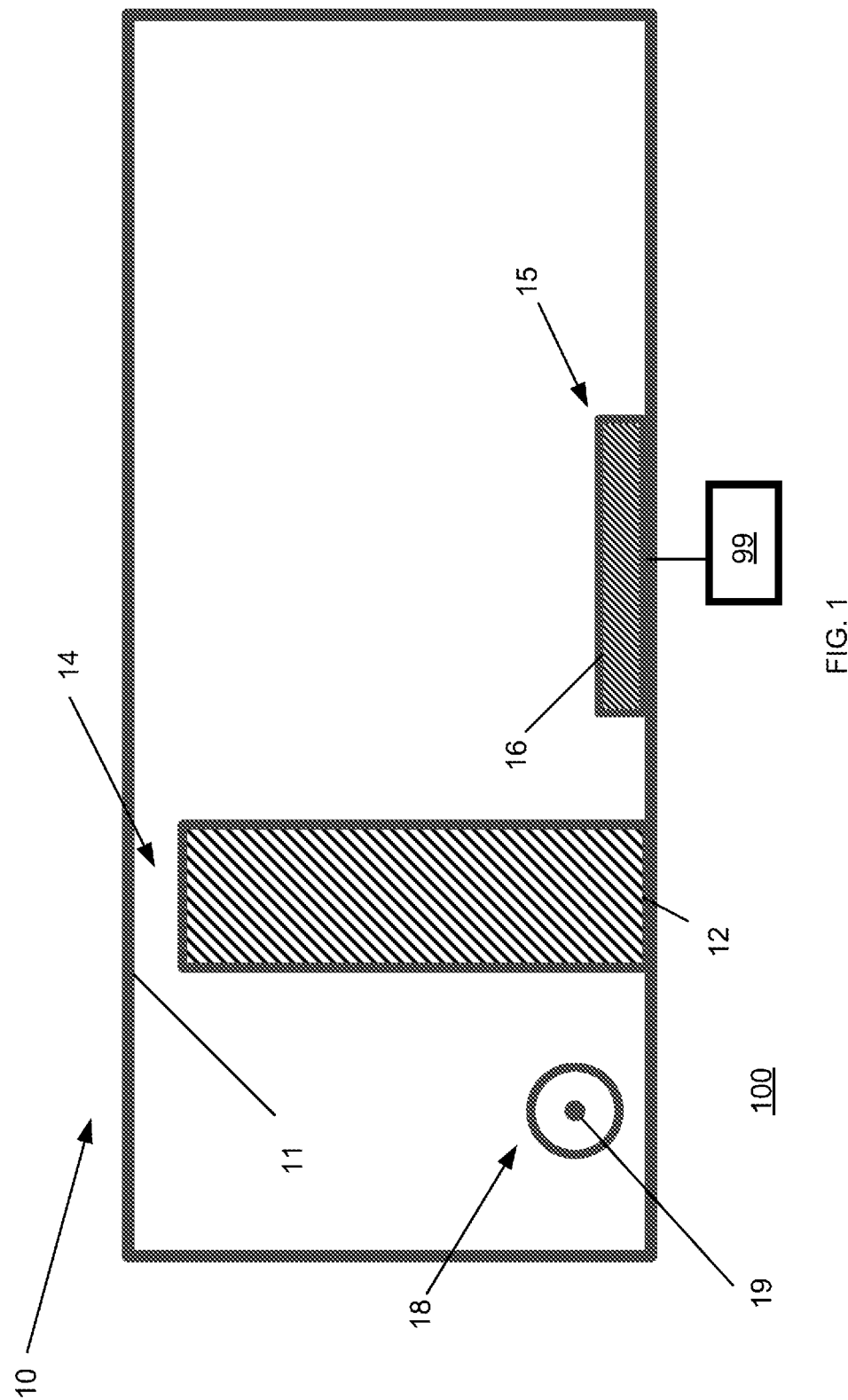
FIG. 1 is a schematic cross-sectional view of a power monitor for a fiber-coupled laser system, according to various embodiments.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items. The systems, apparatus, and methods described herein should not be construed as limiting in any way. Instead, the present disclosure is directed toward all novel and non-obvious features and aspects of the various disclosed embodiments, alone and in various combinations and sub-combinations with one another. The term "or" refers to "and/or," not "exclusive or" (unless specifically indicated).

The disclosed systems, methods, and apparatuses are not limited to any specific aspect or feature or combinations thereof, nor do the disclosed systems, methods, and apparatuses require that any one or more specific advantages be present or problems be solved. Any theories of operation are to facilitate explanation, but the disclosed systems, methods, and apparatuses are not limited to such theories of operation. Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatuses may be used in conjunction with other systems, methods, and apparatus.

Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art. In some examples, values, procedures, or apparatus' are referred to as "lowest," "best," "minimum," or the like. It will be appreciated that such descriptions are intended to indicate that a selection among many used functional alternatives may be made, and such selections need not be better, smaller, or otherwise preferable to other selections.

Examples are described with reference to directions indicated as "above," "below," "upper," "lower," and the like. These terms are used for convenient description, but do not imply any particular spatial orientation.

Fiber-enclosing measurement systems (e.g., power monitors) described herein may more accurately measure one or more characteristics (e.g., power) of laser light of a laser system than some known power monitors. Some fiber-enclosing measurement systems described herein may include an integrating volume or other enclosure to spatially homogenize light emerging from a surface of an optical fiber coupled to the laser system (e.g., from a side of an optical fiber coupled to the laser system). An interior of the integrating volume or other enclosure may define one or more light-processing surfaces to process the emerging light, and direct the processed light to a light sensitive section of an optical sensor (e.g., a photosensor). Sensing the processed light (e.g., the spatially homogenized light) may reduce sensitivity to polarization, compared to some known power monitors that monitor power using light emerging from the surface (e.g., unprocessed light).

In various embodiments, the fiber-enclosing measurement system may be arranged so that there is no line of sight from the light sensitive section of the optical sensor to the surface of the optical fiber, which prevents the light emerging from the surface (e.g., the unprocessed light) from reaching the light sensitive section of the optical sensor. Also, the power monitor may be located in an enclosure that prevents external light (e.g., ambient light) from reaching the light sensitive section of the optical sensor (e.g., a light tight enclosure). Accordingly, the light sensitive section may accurately measure power of the laser light using the processed light provided by the light-processing surface(s).

In some embodiments, one or more walls or other light obstruction including a non-transparent material may be provided in the enclosure to block a line of sight from the light sensitive section to the surface of the optical fiber. In various embodiments the light obstructions may include a wall or other baffle, which may be at least partially formed of a non-transparent plastic such as Polytetrafluoroethylene (PTFE). In some embodiments, the light obstruction(s) may partition the enclosure into a first section containing the part of the optical fiber and a second section containing the optical sensor, which may serve to limit the light received at the light-sensitive section of the optical sensor to light that is redirected two or more times.

Any power monitor described herein may be used in any fiber-coupled laser system, including:
  Fiber-coupled laser systems that may use one or more fiber lasers (in which the source of the laser light is an optical fiber doped with rare-earth elements), and
  Fiber-coupled laser systems that may use one or more lasers having any other laser source, now known or later developed, e.g., any optical gain medium.

A fiber-coupled laser system may propagate laser light generated by the laser source downstream using an optical fiber coupled to the fiber-based or other laser source. In any fiber-coupled laser system a housing may enclose at least part of the optical fiber coupled to the fiber-based or other laser source, and that housing may contain at least one light-processing surface to process light emerging from a side of this coupled optical fiber. In some embodiments, the laser source may include more than one individual laser source, each of which may have a downstream optical fiber and power monitor coupled thereto.

Figure 2:
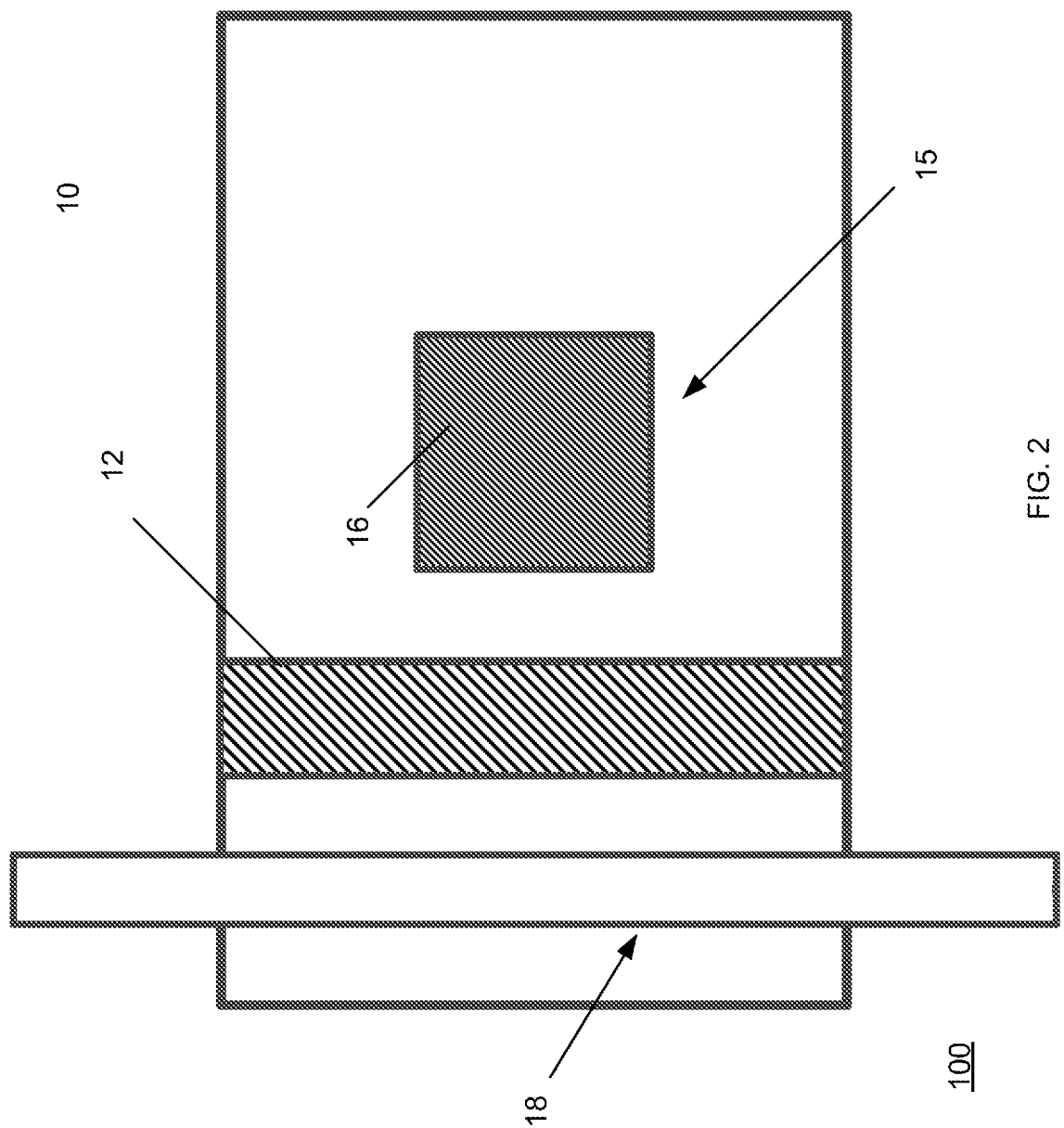
FIG. 2 is a schematic top view of an interior of the power monitor of FIG. 1.
Figure 3:
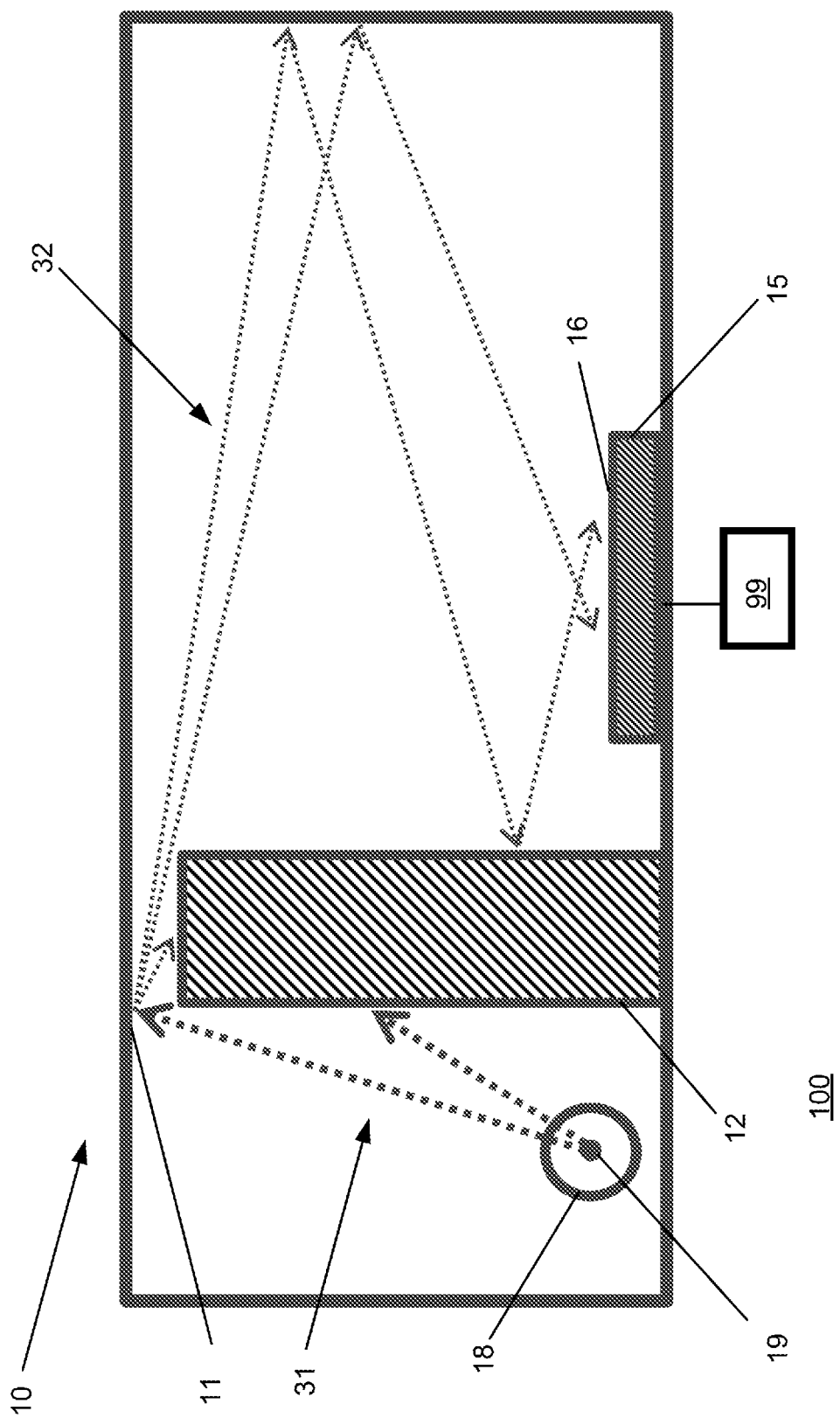
FIG. 3 is another schematic cross-sectional view of the power monitor of FIG. 1 illustrating a light path during operation of a fiber-coupled laser system.

FIG. 1 is a schematic cross-sectional view of a power monitor 100 for a laser system, according to various embodiments. FIG. 2 is a schematic top view of an interior of the power monitor 100 of FIG. 1. FIG. 3 is another schematic cross-sectional view of the power monitor 100 of FIG. 1, illustrating a light path during operation of a laser system.

Referring now to FIG. 1, the power monitor 100 may include an enclosure 10 containing a section of an active optical fiber 18 of a laser system. As will be explained later with reference to FIG. 4, in some embodiments the enclosure 10 may be an integrating volume. Referring again to FIGS. 1-3, when the laser system is operated, light 31 (FIG. 3) emerges laterally from a side of the active optical fiber 18.

The enclosure 10 may further include an optical sensor 15 (e.g., a photosensor), which may be any optical sensor, now known or later developed. The optical sensor 15 may generate electrical signals indicative of one or more characteristics of laser light of a core 19 of the optical fiber 18. The electrical signals may be interpreted by processing circuitry 99 coupled to the optical sensor 15 (to derive measurement data from the sensor signal), and then the measurement data may be stored and/or used to adjust the laser system to application requirements.

In contrast to some known power monitors, in the power monitor 100, there is no line of sight from a light sensitive section 16 (e.g., a light sensitive surface, volume, or the like) of the optical sensor 15 to the side of the enclosed part of the optical fiber 18. In this embodiment, the light sensitive section 16 faces away from the optical fiber 18; however, this facing arrangement may not be required in other embodiments.

To prevent a line of sight, in this embodiment one or more light obstructions 12 (e.g., a non-transparent wall, in this example) may be located in close proximity to the side of the optical fiber 18, e.g., between the optical sensor 15 and the optical fiber 18. The light obstruction 12 may be a non-transparent structure that may block the line of sight from a light sensitive section 16 of the optical sensor 15 to the side of the optical fiber 18. In other embodiments, it may be possible and practical to block line of sight based on the positioning of the optical sensor 15 in the enclosure and/or a shape of the cavity, and as such light obstruction(s) may not be required in those embodiments.

The light obstruction 12 may be formed from a single material or a combination of materials. In various embodiments, material(s) of the light obstruction 12 may include a translucent or an opaque material, such as a non-transparent plastic, e.g., polytetrafluoroethylene (PTFE). In some embodiments, it may be possible to coat any material (non-transparent, or otherwise) with a non-transparent coating (e.g., a translucent coating) that may redirect and/or process the unprocessed light 31 (FIG. 3) emerging from the side of the optical fiber 18.

In this embodiment, a gap 14 is provided between part of the light obstruction 12 (e.g., a top of the light obstruction 12, in this embodiment) and a light-processing surface 11 within the enclosure 10 (e.g., at least part of an interior surface of the enclosure 10). The gap 14 allows processed light 32 (FIG. 3) to reach a part of the enclosure in which the optical sensor 15 may be located.

In various embodiments, the light obstruction 12 may partition an interior cavity of the enclosure 10 into a first section and a second different section. The first original light emerging from the part of the optical fiber may be provided only in the first section of the first and second sections. All the light in the second section may be second light emerging from the gap (e.g., second light derived from the first light).

In some embodiments, the second section may be larger than the first section (e.g., have a greater volume); of course this is not required.

The light-processing surface 11 may be a diffuse reflection surface. In contrast to a specular reflection surface (e.g., a polished metal plate or a mirror-coated glass plate, as used in some known power monitors), a diffuse reflection surface may be ground or roughened. FIG. 3 illustrates diffuse reflection by the light-processing surface 11, to provide the processed light 32.

Figure 4:
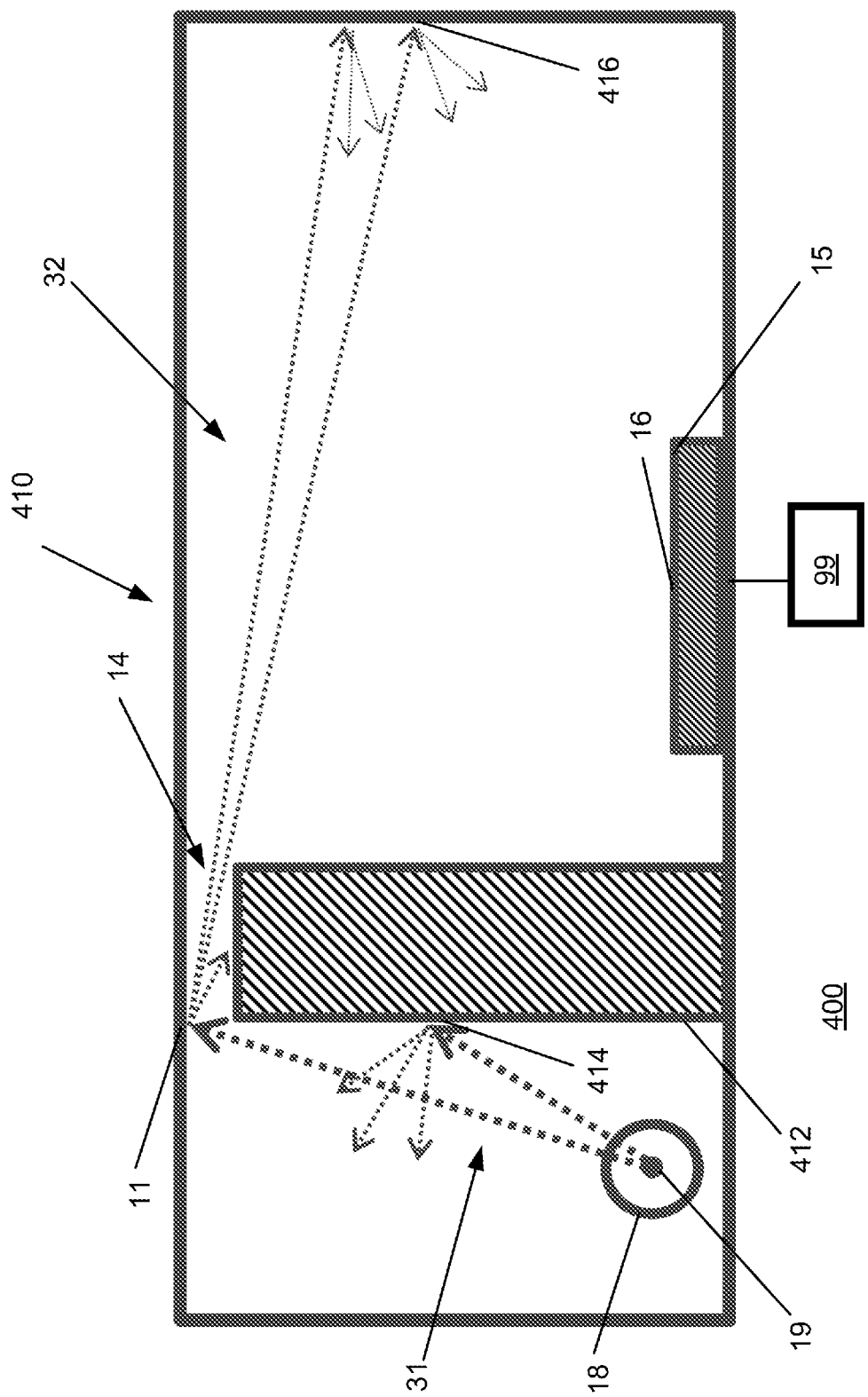
FIG. 4 is a schematic cross-sectional view of another power monitor in which the enclosure may be an integrating volume.

FIG. 4 is a schematic cross-sectional view of another power monitor 400 in which an enclosure 410 may be an integrating volume. An integrating volume is an optical device including a hollow cavity having a diffuse reflection interior. While some known integrating volumes are spheres having a diffuse reflecting coating covering an entire interior of the sphere, integrating volumes described herein may have any shape (spherical, or otherwise) in which at least a section of the interior of the integrating volume may be diffuse reflection surfaces.

FIG. 4 illustrates that the power monitor 400 may include more than one diffuse reflection surface. For example, at least one surface of the light obstruction 412 may be a diffused reflection surface 414 to process the emerging light 31, as illustrated. Also, an interior of the enclosure 410 may include diffuse reflection surfaces 416, as illustrated.

The diffuse reflection surface 416 may redirect processed light exiting the gap 14. Diffuse reflection surface 416 may further process the processed light 32 egressing from the gap 14, as illustrated. Due to the section 416 on the opposite side of the cavity as the optical fiber 18 and the lack of line of sight (provided, in this embodiment, by the light obstruction 412), in this embodiment the light sensitive section 16 may be exposed only to light processed two or more times. This may be beneficial for some applications, compared to power monitoring in which a light sensitive section is exposed to an unprocessed portion of the emerging light and/or light processed only one time.

In one embodiment, an enclosure cavity may have a shape of a spherical segment to optimize the amount of diffuse reflection light reaching the light sensitive section 16 of the optical sensor 15 using a minimal volume of space. In these embodiments, at least part of the dome interior (e.g., some or all of the dome interior) may be a diffuse reflection surface. In other embodiments, it may be practical and possible to have a faceted dome interior or some other interior with one or more flats, and at least part of at least some of the flats may be diffuse reflection surfaces.

In one example, some of the advantages of a spherical segment may be provided with a low height profile by using a shape of a stadium segment for the dome interior. This is shown in the cross-sectional view illustrated in the '950 provisional, in which the dome interior has a single flat extending from the first section to the second section, and two curved surfaces (e.g., circular arcs such as ninety degree circular arcs or any other linear or non-linear slope) corresponding to the first and second sections of the cavity, respectively.

Figure 5:
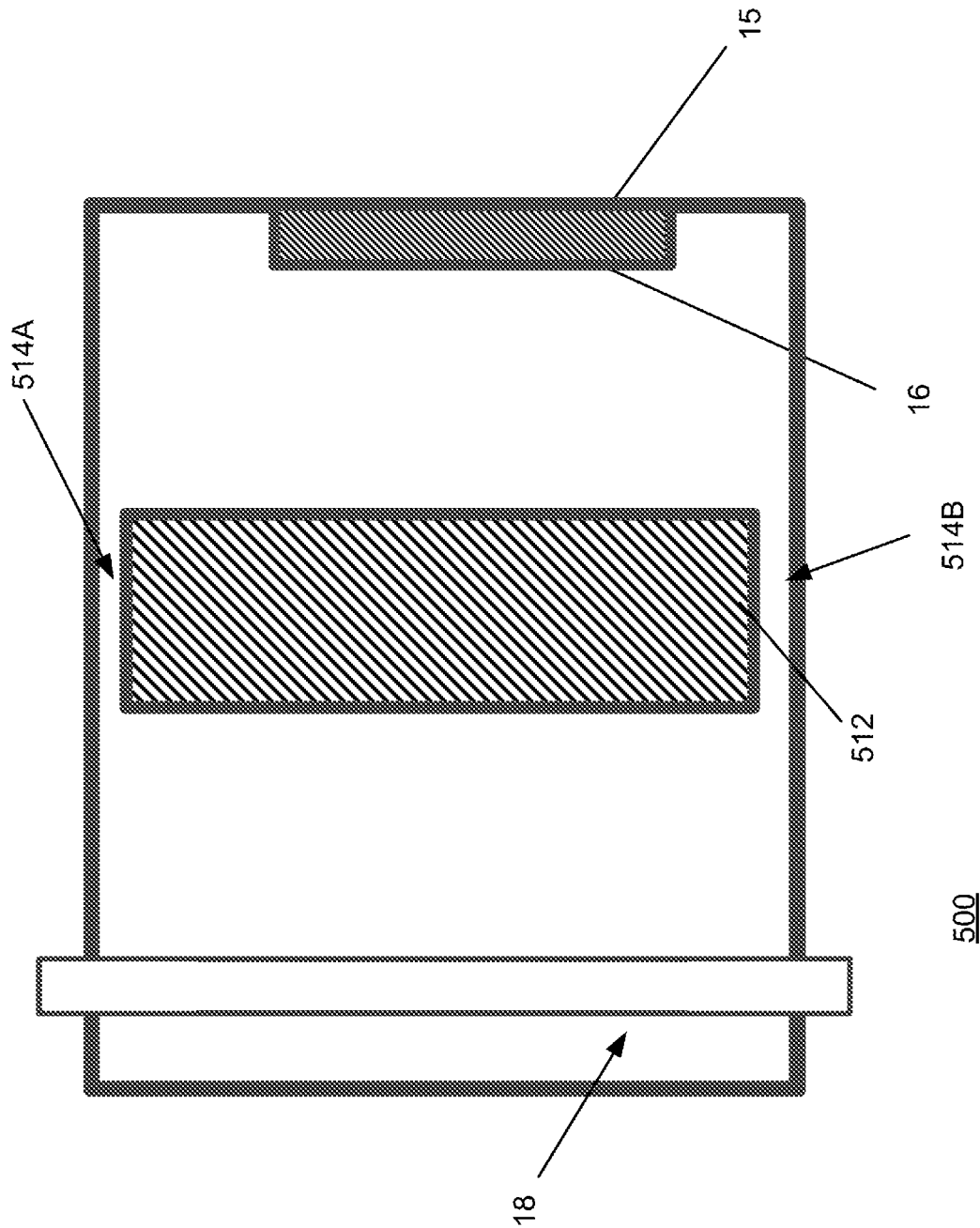
FIG. 5 is a schematic top view of an interior of a power monitor with a light obstruction providing side gaps, according to various embodiments.

FIG. 5 is a schematic top view of an interior of a power monitor 500 with a light obstruction 512 providing side gaps 514A and 514B, according to various embodiments. In various embodiments, the side gap(s) 514A and/or 514B may be provided between sides of an enclosure and sides of the light obstruction 512, as illustrated. Gap(s) 514A and/or 514B may be provided in addition to, or instead of, a gap similar to gap 14 (FIG. 1). Providing gaps on the sides and top of an enclosure may increase an amount of light sampled by the light sensor 15, which may be advantageous for some applications.

To further increase an amount of light sampled by the light sensor 15, in this embodiment the light sensitive surface 16 of the light sensor 15 is facing the optical fiber 18 by locating the light sensor 15 on a side enclosure instead of on a bottom of the enclosure, as in previously described embodiments. With such an arrangement of the light sensor 15, dimensions of the light obstruction 512, the enclosure, and/or the size of the light sensitive surface 16 may be selected to ensure that all light received by the light sensitive surface 16 does not have a single bounce path, if needed for a given application.

Figure 6:
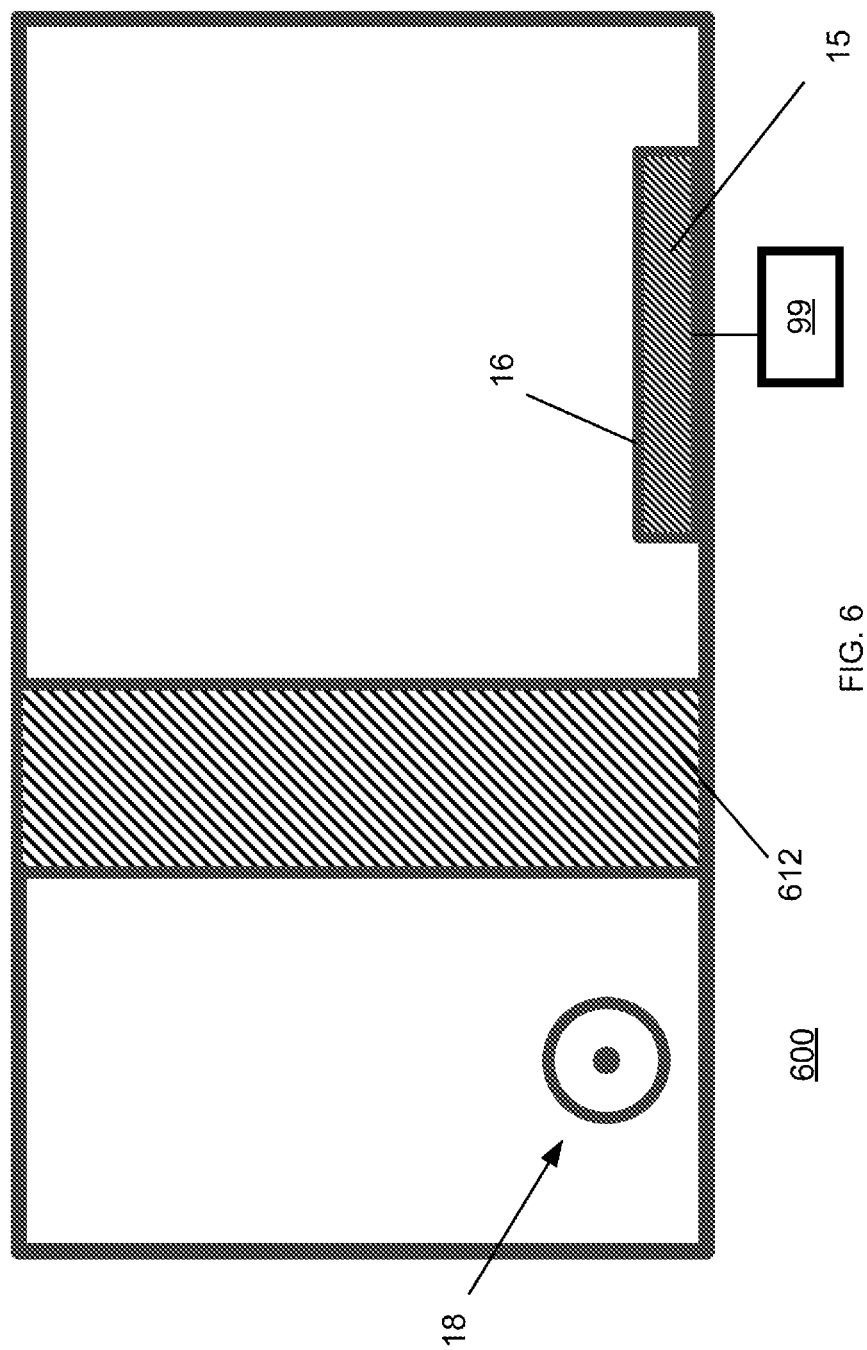
FIG. 6 is a schematic cross-sectional view of a power monitor with a translucent light obstruction that fully partitions the enclosure, according to various embodiments.
Figure 7:
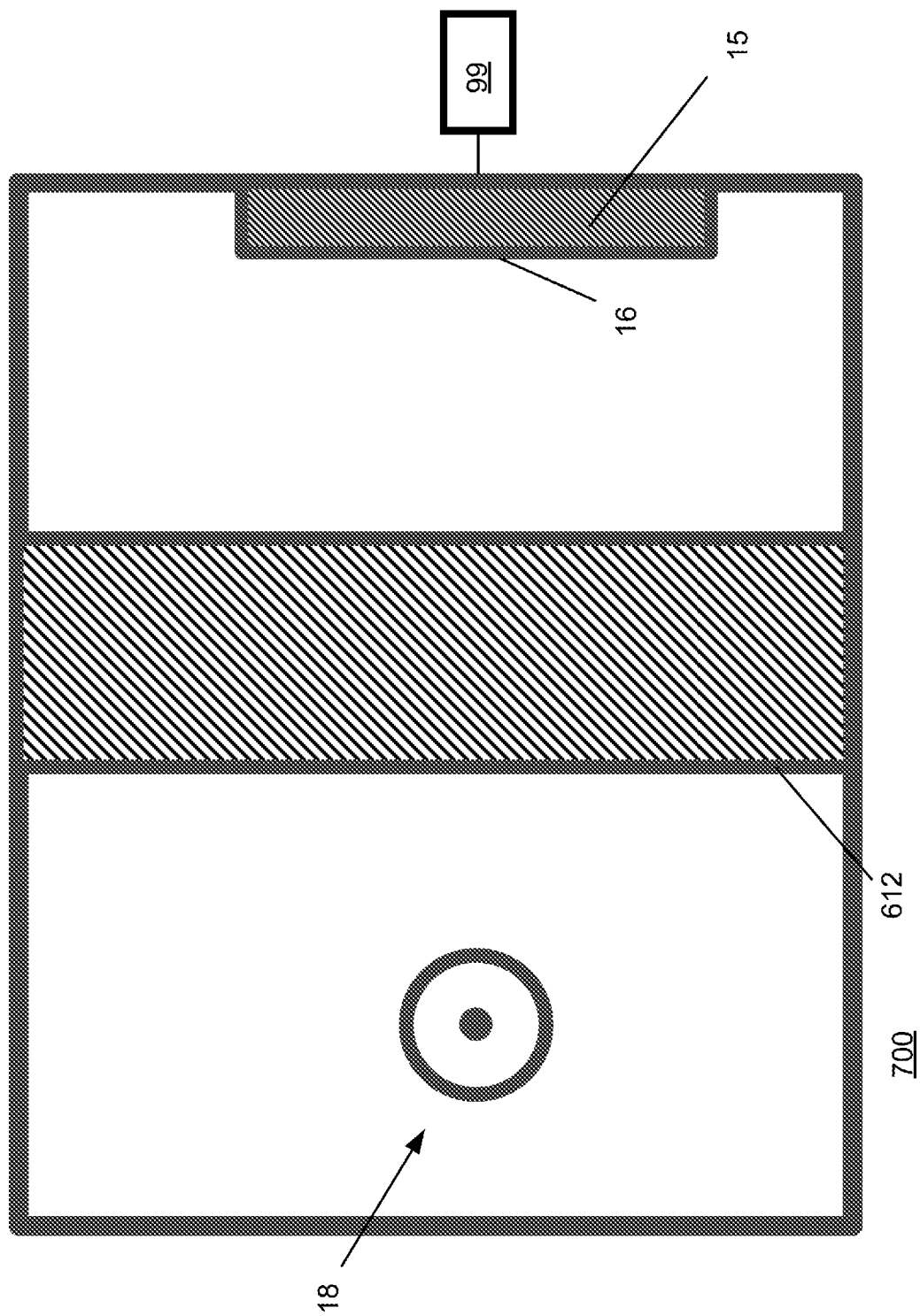
FIG. 7 is a schematic cross-sectional view of another power monitor employing the translucent light obstruction of FIG. 6, according to various embodiments.

FIG. 6 is a schematic cross-sectional view of a power monitor 600 with a translucent light obstruction 612 that fully partitions an enclosure (e.g., no gaps), according to various embodiments. FIG. 7 is a schematic cross-sectional view of another power monitor 700 employing the translucent light obstruction of FIG. 6, according to various embodiments.

In the embodiments illustrated in FIGS. 6 and 7, all light (not shown) reaching the light sensor 15 passes through a diffusely transmitting translucent material of the translucent light obstruction 612. Since there are no gaps, the light sensor 15 does not have a line of sight to the optical fiber 18 at any light sensor location in the second section of the enclosure (e.g., on a bottom of the enclosure as illustrated in FIG. 6 or a side of the enclosure as illustrated in FIG. 7). In both of the embodiments illustrated in FIGS. 6 and 7, all light reaching the light sensor 15 may be processed two or more times as it scatters inside the diffuser (e.g., the translucent light obstruction 612).

In the embodiments described herein, the emerging light from the side of the optical fiber may have a polarization/direction that varies with time. One or more light-processing surfaces within the enclosure may be arranged to process this light, which may filter out that spatial information, which may provide less sensitivity to polarization than some known power monitors. Processing by the light processing surfaces within the enclosure may perform diffusion (e.g., diffuse reflection), but in other examples it may be possible and practical to arrange the light-processing surface(s) to perform some other type of light processing instead of, or in addition to, diffuse reflection.

In any power monitor, processing circuitry may include a general purpose processor and a hardware memory to store instructions executable by the general purpose processor, or some other circuitry such as an application specific processor. The processing circuitry may consume raw data (e.g., a sensor signal) output by an optical sensor, and may in turn output data derived from the raw data. The output data may be generated using any laser system monitoring algorithms now known or later developed, and in some embodiments may include a control signal to adjust operation of the laser system based on the measured optical power of the light sampled by the optical sensor (e.g., the processed light reaching the light sensitive section of the optical sensor).

It should be appreciated that a fiber-coupled laser system may have any number of individual laser sources. For example, in some fiber-coupled laser systems, a combiner receives laser light generated from different individual laser sources and outputs combined laser light. Various embodiments of power monitors described herein may be employed anywhere downstream of the individual laser sources, for example upstream from the combiner (in which case power monitors may generate measurements corresponding to each individual laser source), and/or downstream from the combiner (in which case a power monitor may generate a measurement corresponding to the combined laser light). In some embodiments, a cladding light stripper may be provided upstream of an enclosure of a power monitor (e.g. outside of the enclosure) to filter light carried in a cladding of the optical fiber, so that the light emerging from the part of the optical fiber enclosed by the power monitor originates from the core of the optical fiber.

Figure 8:
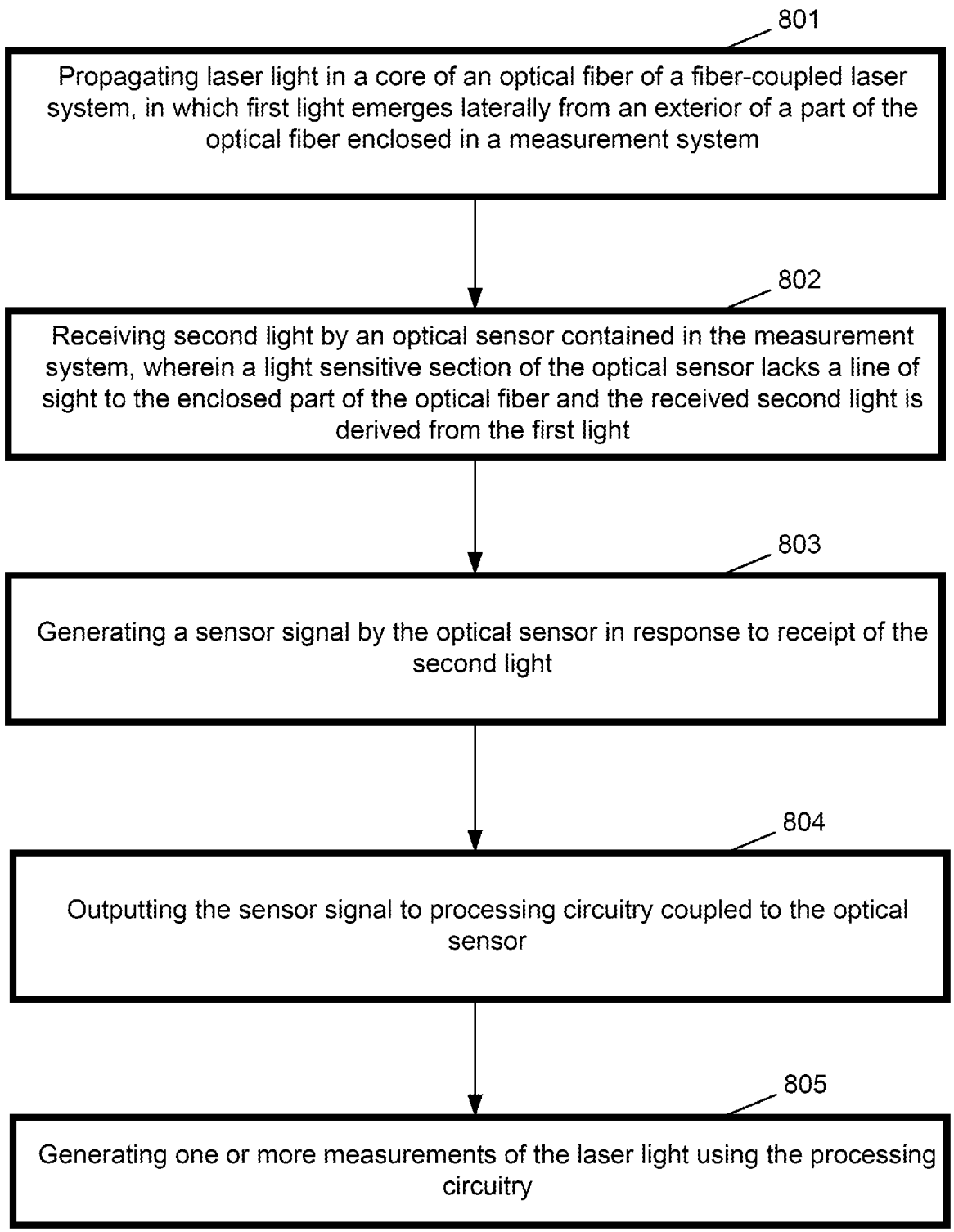
FIG. 8 illustrates a process of generating, using any power monitor or other fiber-enclosing measurement system utilizing any of the principles described herein, one or more measurements of laser light originating from at least one laser source of a fiber-coupled laser system.

FIG. 8 illustrates a process 800 of generating, using any power monitor or other fiber-enclosing measurement system utilizing any of the principles described herein, one or more measurements of laser light originating from at least one laser source of a fiber-coupled laser system. In block 801, any laser light is propagated in a core of an optical fiber of the fiber-coupled laser system, in which first light emerges laterally from an exterior of a part of the optical fiber that is enclosed by the measurement system.

In block 802, an optical sensor contained in the measurement system receives second light. A light sensitive section of the optical sensor lacks a line of sight to the enclosed part of the optical fiber, and the second light is derived from the first light. In some embodiments, the second light may be processed two or more times by light-processing surfaces within the enclosure.

In block 803, the optical sensor may generate a sensor signal in response to receipt of the second light. In block 804, the optical sensor may output the sensor signal to processing circuitry coupled to the optical sensor. In block 805, the processing circuitry may generate one or more measurements of the laser light using the processing circuitry. In various embodiments, the one or more measurements may be stored in a hardware memory of the processing circuitry, transmitted to a remote processor, used to generate a control signal to adjust one or more operating parameters of the fiber-coupled laser system, or the like, or combinations thereof.

A housing having an interior cavity may collect and integrate scattered light from the fiber, while also preventing the photodiode from viewing first bounce light from the fiber. Various embodiments may have one or more of the following features associated with generating a higher signal to noise ratio (signal to noise ratio=the amount of signal the sensor receives relative to stray ambient light that leaks into the integration volume, or noise generated in the wires from electric fields):

The housing may have a higher view to scatter ratio than previous approaches (view to scatter ratio=the amount of surface area the sensor is arranged to view relative to the surface area illuminated by scattered light from the fiber)

The photo diode surface area may be larger than power monitors that may have a requirement for "close proximity" of an optical sensor to the optical fiber;

The light shield and fully enclosed design may both contribute to blocking a high percentage of ambient light.

Some embodiments may include one or more of the following characteristics:

Exposed fiber length=7-9 mm (some previous approaches may have a 12.7 mm exposed fiber length)

Cavity volume~560 mm^3 (some previous approaches may have a ~1177 mm^3 exposed cavity volume)

Upper dome surface area=285.3 mm^2 (some prior approaches may have a ~20 mm^3 viewing area) to minimize cavity volume requirements Total integrating area=600 mm^2 (some prior approaches may have a total integrating area~477 mm^2)

View ratio=23-45% depending on baffle design (some prior approaches may have a 4% view ratio)

Any power monitor described herein may be used in any fiber-coupled laser system, including:

Fiber-coupled laser systems that may use one or more fiber lasers (in which the source of the laser light is an optical fiber doped with rare-earth elements), and Fiber-coupled laser systems that may use one or more lasers having any other laser source, now known or later developed, e.g., any optical gain medium.

A fiber-coupled laser system may propagate laser light generated by the laser source downstream using an optical fiber coupled to the fiber-based or other laser source. In any fiber-coupled laser system, a housing may enclose at least part of the optical fiber coupled to the fiber-based or other laser source, and that housing may contain at least one light-processing surface to process light emerging from a side of this coupled optical fiber. In some embodiments, the laser source may include more than one individual laser source, each of which may have a downstream optical fiber and power monitor coupled thereto.

In view of the many possible embodiments to which the principles of the disclosed technology may be applied, it should be recognized that the illustrated embodiments are only preferred examples and should not be taken as limiting the scope of the disclosure.

The invention claimed is:

1. An apparatus, comprising:
a power monitor comprising an active optical fiber, an optical sensor having a light sensitive section, one or more light obstructions located on a side of the active optical fiber between the active optical fiber and the optical sensor that block a line of sight from the light sensitive section to the side of the active optical fiber, and a gap provided between a part of the one or more light obstructions and a light-processing surface,
wherein the optical sensor generates electrical signals indicative of one or more characteristics of laser light propagated in a core of the active optical fiber,
wherein the power monitor measures power of laser light propagating in the core of the active optical fiber and generates
a sensor signal using the optical sensor; and
wherein the sensor signal is uses a second light that emerges from the gap derived from a first light emerging laterally from an exterior of a part of the active optical fiber.

2. The apparatus of claim 1, wherein the power monitor outputs the sensor signal to processing circuitry coupled to the optical sensor.

3. A fiber-coupled laser system employing the power monitor of claim 2, wherein the active optical fiber is coupled to a laser source that generates the laser light.

4. The apparatus of claim 3, wherein the processing circuitry generates a control signal to adjust one or more operating characteristics of the fiber-coupled laser system based on the measured power.

5. The apparatus of claim 1, wherein the optical sensor is positioned so that the light sensitive section faces away from the part of the active optical fiber.

6. A method of measuring power or one or more other characteristics of laser light propagating in a core of an active optical fiber of a fiber-coupled laser system based on a first light emerging laterally from an exterior of a part of the active optical fiber, the method comprising:

receiving second light by an optical sensor having a light sensitive section, wherein the second light emerges from a gap provided between a part of one or more light obstructions and a light-processing surface, the one or more light obstructions located on a side of the active optical fiber between the active optical fiber and the optical sensor that block a line of sight from the light sensitive section to the side of the active optical fiber, the second light derived from the first light;

generating a sensor signal by the optical sensor in response to receipt of the second laser light; and outputting the sensor signal to processing circuitry coupled to the optical sensor.

7. The method of claim 6, further comprising:
generating a control signal for the fiber-coupled laser system using the processing circuitry.

8. The method of claim 6, further comprising:
storing an output of the processing circuitry in a hardware memory.

9. The method of claim 6, further comprising at least partially partitioning an enclosure into a first section and a second section, wherein the part of the active optical fiber is located in the first section of the enclosure and the optical sensor is located in the second section of the enclosure.

10. The method of claim 6, further comprising at least partially partitioning an integrating volume into a first section and a second section, wherein the part of the active optical fiber is located in the first section of the integrating volume and the optical sensor is located in the second section of the integrating volume.

11. A power monitor to measure power of laser light propagated in a core of an active optical fiber, the power monitor comprising:

an enclosure through which the active optical fiber is disposed, wherein first light emerges laterally from an enclosed part of the active optical fiber;

an optical sensor comprising a light sensitive section, wherein the optical sensor generates electrical signals indicative of one or more characteristics of laser light propagated in the core of the active optical fiber;

one or more light obstructions located on a side of the active optical fiber between the active optical fiber and the optical sensor that block a line of sight from the light sensitive section to the side of the active optical fiber;

a gap provided between the part of the one or more light obstructions and a light-processing surface;

wherein the optical sensor receives second light derived from the first light, and generates a sensor signal responsive to a second light that emerges from the gap derived from a first light emerging laterally from an exterior of a part of the active optical fiber; and a processor connected to the optical sensor;
wherein the processor receives the sensor signal,
wherein the processor derives measurement data from the sensor signal, and wherein the measurement data comprises the measured power of the laser light propagated in the core of the active optical fiber.

12. The power monitor of claim 11, wherein the one or more comprising:

light obstructions are disposed within the enclosure between the part of the active optical fiber and the optical sensor, wherein the one or more light obstructions separate the enclosure into a first section containing the active optical fiber and a second section containing the optical sensor, and wherein the one or more light obstructions receive a portion of the first light thereby preventing establishment of the line of sight from the light sensitive section to the part of the active optical fiber.

13. The power monitor of claim 11, further comprising:
wherein the enclosure includes a first section containing the part of the active optical fiber and a second section containing the optical sensor, and wherein the light sensitive section of the optical sensor faces away from the part of the active optical fiber, thereby preventing establishment of the line of sight from the light sensitive section to the part of the active optical fiber.

14. The power monitor of claim 11,
wherein the light-processing surface processes the first light and transmits the second light, and wherein the light-processing surface is ground or roughened.

15. The power monitor of claim 11,
wherein the light-processing surface processes the first light and transmits the second light, and wherein the light-processing surface comprises a diffuse reflection surface.

16. The power monitor of claim 15, wherein the light-processing surface comprises part of an interior of the enclosure.

17. The power monitor of claim 16, wherein the light-processing surface comprises a plurality of light-processing surfaces including the part of the interior of the enclosure and part of a light obstruction disposed within the enclosure between the part of the active optical fiber and the optical sensor.

18. The power monitor of claim 12, wherein the one or more light obstructions comprise
a translucent wall or other translucent body, or
a non-transparent wall or other non-transparent body;
wherein the light obstruction is formed from a translucent plastic or other non-transparent material or includes a translucent or other non-transparent surface facing the contained part of the optical fiber.

19. The power monitor of claim 15, wherein the light-processing surface is located on a flat surface of an interior of the enclosure.

* * * * *